United States Patent
Wada et al.

[11] Patent Number: 5,835,340
[45] Date of Patent: Nov. 10, 1998

[54] MONOLITHIC CERAMIC CAPACITOR

[75] Inventors: Hiroyuki Wada, Shiga-ken; Harunobu Sano, Kyoto; Norihiko Sakamoto, Shiga-ken, all of Japan

[73] Assignee: Murata Manufacturing Co., Ltd., Kyoto-fu, Japan

[21] Appl. No.: 895,846

[22] Filed: Jul. 18, 1997

[30] Foreign Application Priority Data

Jul. 19, 1996 [JP] Japan ................................. 8-190630
Sep. 10, 1996 [JP] Japan ................................. 8-239259

[51] Int. Cl.$^6$ .............................. H01G 4/06; H01G 4/20; H01G 4/228; H01G 2/20
[52] U.S. Cl. ...................... 361/321.5; 361/303; 361/305; 361/306.1; 361/306.3; 361/308.1; 361/309; 361/310; 361/311; 361/313; 361/320; 361/321.1; 361/321.4
[58] Field of Search .............................. 361/301.1, 301.4, 361/303–305, 306.1–306.3, 308.1–308.2, 309–313, 320–321.5, 323; 501/134–136, 108, 152; 29/25.42

[56] References Cited

U.S. PATENT DOCUMENTS 5,225,960   7/1993   Kishi et al. ........................ 361/29.42
5,659,456   8/1997   Sano et al. ......................... 361/321.4

Primary Examiner—Bot L. Ledynh
Attorney, Agent, or Firm—Ostrolenk, Faber, Gerb & Soffen, LLP

[57] ABSTRACT

A monolithic ceramic capacitor having a plurality of dielectric ceramic layers, internal electrodes, and external electrodes electrically connected to the internal electrode, wherein the dielectric ceramic layers comprise (a) barium titanate having an alkali metal oxide impurity content of not more than about 0.02% by weight, (b) scandium oxide and/or yttrium oxide, (c) gadolinium oxide, terbium oxide and/or dysprosium oxide, (d) manganese oxide, (e) cobalt oxide, and (f) nickel oxide, and is a material containing (1) 100 mols represented by the compositional formula:

$$(1-\alpha-\beta)\{BaO\}_m \cdot TiO_2 + \alpha\{(1-x)M_2O_3 + xRe_2O_3\} + \beta(Mn_{1-y-z}Ni_y Co_z)O$$

wherein $M_2O_3$ represents the above-mentioned (b); $Re_2O_3$ represents the above-mentioned (c); $0.0025 \leq \beta \leq 0.05$; $\beta/\alpha \leq 4$; $0 < x \leq 0.50$; $0 \leq 1.0$; $0 \leq z1.0$; $0 \leq y+z<1.0$; and $1.000 < m \leq 1.035$, (2) about 0.5 to 5.0 mol, in terms of MgO, of magnesium oxide and (3) about 0.2 to 3.0 parts by weight, per 100 pph of components (1) and (2), of $SiO_2$-$TiO_2$-MO-based oxide glass (wherein MO represents at least one member selected from the group consisting of BaO, CaO, SrO, MgO, ZnO, and MnO). The internal electrodes can be nickel or a nickel alloy.

15 Claims, 3 Drawing Sheets

MONOLITHIC CERAMIC CAPACITOR

FIELD OF THE INVENTION

This invention relates to a ceramic capacitor, more particularly a monolithic ceramic capacitor having internal electrodes made of nickel or a nickel alloy.

BACKGROUND OF THE INVENTION

A monolithic ceramic capacitor is generally produced according to the following procedures. Dielectric ceramic layers in sheet form having applied thereon an electrode material to serve as an internal electrode are prepared. A ceramic material mainly comprising, e.g., $BaTiO_3$ is used as a dielectric ceramic layer. A plurality of the dielectric ceramic layers with the electrode material are piled up and press-bonded under heat into one body. The resulting laminate is calcined at 1250° to 1350° C. to obtain a ceramic laminate having internal electrodes. An external electrode is baked onto both sides of the ceramic laminate to make an electrical connection to the internal electrodes and obtain a monolithic ceramic capacitor.

The material for the internal electrodes are required to satisfy the following conditions:

1. To have a melting point at or above the calcining temperature of the ceramic laminate because the internal electrodes and the ceramic laminate are calcined simultaneously.

2. To be resistant to oxidation in a high-temperature oxidative atmosphere and be unreactive with the dielectric ceramic layer.

Noble metals, such as platinum, gold, palladium and a silver-palladium alloy, have been used as an electrode material satisfying these requirements. While excellent in performance, these electrode materials are so expensive that the proportion of the electrode material cost reaches 30 to 70% of the entire material cost, which has been the greatest factor of increasing the production cost of monolithic ceramic capacitors.

In addition to noble metals, base metals, such as Ni, Fe, Co, W and Mo, also have a high melting point. However, these base metals are readily oxidized in a high-temperature oxidative atmosphere, causing them to fail to perform their function as an electrode. Therefore, calcination of the base metal together with dielectric ceramic layers must be carried out in a neutral or reducing atmosphere before they can be used as an internal electrode of a monolithic ceramic capacitor. However, the problem is that a conventional dielectric ceramic material undergoes vigorous reduction into a semiconductor if calcined in a neutral or reducing atmosphere.

Dielectric ceramic materials which have been proposed in order to solve the above problem include a dielectric ceramic material comprising a barium titanate solid solution having a barium site to titanium site ratio in excess of a stoichiometric one (see JP-B-5742588, the term "JP-B" as used herein means an "examined published Japanese patent application") and a dielectric ceramic material comprising a barium titanate solid solution having incorporated therein an oxide of a rare earth metal, such as La, Nd, Sm, Dy or Y (see JP-A-61101459, the term "JP-A" as used herein means an "unexamined published Japanese patent application").

On the other hand, dielectric ceramic materials whose dielectric constant has reduced temperature dependence, such as $BaTiO_3$-$CaZrO_3$-$MnO$-$MgO$ system (see JPA-62-256422) and $BaTiO_3$- (Mg, Zn, Sr or Ca)O-$B_2O_3$-$SiO_2$ system (see JP-B-61-14611), have also been proposed.

Use of these dielectric ceramic materials have made it possible to obtain a ceramic laminate that is not transformed into a semiconductor even when calcined in a reducing atmosphere, thereby making it feasible to produce a monolithic ceramic capacitor in which a base metal, such as nickel, is used as an internal electrode.

In recent years, size reduction of electronic components has accelerated rapidly in the development of electronics. Monolithic ceramic capacitors have also showed a remarkable tendency to reduction in size and increase in capacity. There has thus been an increasing demand for a dielectric ceramic material which has a high dielectric constant, shows reduced variation in dielectric constant with temperature change, and is thereby highly reliable.

The dielectric ceramic materials disclosed in JP-B-57-42588 and JP-A-61-101459 exhibit a high dielectric constant but have a large crystal grain size on calcination. When they are applied to a monolithic ceramic capacitor in which each dielectric ceramic layer has a small thickness such as 10 μm or less, the number of crystal grains existing per layer is decreased, resulting in diminished reliability. Besides, these materials undergo considerable variation in dielectric constant with temperature change and are not regarded to meet the demands of the market sufficiently.

The dielectric ceramic material disclosed in JP-A-62-256422, on the other hand, exhibits a relatively high dielectric constant and provides on calcination, a ceramic laminate having a small crystal grain size and small variation of dielectric constant with temperature change. However, $CaZrO_3$ and $CaTiO_3$ produced on calcination tend to form a secondary phase together with MnO, etc., which has made the resulting monolithic ceramic capacitor less reliable in high temperatures.

The dielectric ceramic material disclosed in JP-B-61-14611 exhibits a dielectric constant of 2000 to 2800, which is disadvantageous for achieving size reduction and capacity increase in a monolithic ceramic capacitor. Moreover, the material fails to fulfill the requirement of X7R characteristics specified by EIA (Electronic Industries Association) standards that the percentage of change in electrostatic capacity be within a range of ±15% in the temperature range of from −55° C. to +125° C.

Although JP-A-5-9066, JP-A-5-9067, and JP-A-59068 have proposed ceramic compositions in order to eliminate these problems, the ever-continuing demand for size reduction and capacity increase has been producing a keen demand for dielectric ceramic materials with greater reliability. At the same time, demand for thickness reduction of a ceramic dielectric layer has been getting intenser.

Thus, there has been the necessity for the development of a small-sized and high-capacity monolithic ceramic capacitor having excellent reliability in a high temperature and high humidity environment.

SUMMARY OF THE INVENTION

An object of the present invention is to provide an economical, small-sized and high-capacity monolithic ceramic capacitor which has a dielectric constant of 3000 or higher and an insulation resistance as high as 6000MΩ•μF or more at room temperature or 2000MΩ•μF or more at 125° C., as expressed in terms of the product of capacitance and insulation resistance (CR product), and whose capacity exhibits temperature characteristics satisfying the B characteristics specified by JIS (Japanese Industrial Standards) and the X7R characteristics specified by EIA standards, and which has excellent weathering performance in, for example, loading in high temperature or high humidity.

The present invention provides a monolithic ceramic capacitor having a laminate of a plurality of dielectric ceramic layers, a plurality of internal electrodes each formed between two adjacent dielectric ceramic layers in such a manner that one end of each internal electrode is exposed at one end of the dielectric ceramic layer alternately, and a pair of external electrodes each electrically connected to the plurality of exposed internal electrodes of the laminate, in which the dielectric ceramic layer comprises (a) barium titanate having an alkali metal oxide impurity content of not more than about 0.02% by weight, (b) at least one member selected from the group consisting of scandium oxide and yttrium oxide, (c) at least one member selected from the group consisting of gadolinium oxide terbium oxide and dysprosium oxide, (d) manganese oxide, (e) cobalt oxide and (f) nickel oxide, and is made up of a material containing (1) 100 mol of a main component represented by the compositional formula:

$(1-\alpha-\beta)\{BaO\}_m \cdot TiO_2 + \alpha\{(1-x)M_2O_3 + xRe_2O_3\} + \beta(Mn_{1-y-z}Ni_y Co_z)O$ wherein $M_2O_3$ represents at least one member selected from the group consisting of $Sc_2O_3$ and $Y_2O_3$; $Re_2O_3$ represents at least one member selected from the group consisting of $Gd_2O_3$, $Tb_2O_3$, and $Dy_2O_3$; $0.0025 \leq \alpha \leq 0.025$; $0.0025 \leq \beta \leq 0.05$; $\beta/\alpha \leq 4$; $0 < x \leq 0.50$; $0 \leq y \leq 1.0$; $0 \leq z \leq 1.0$; $0 \leq y+z < 1.0$; and $1.000 < m < 1.035$, (2) about 0.5 to 5.0 mol, in terms of MgO, of magnesium oxide as a secondary component, and (3) about 0.2 to 3.0 parts by weight, per 100 parts by weight of the total weight of the main component (1) and the secondary component (2), of $SiO_2$-$TiO_2$-MO-based oxide glass (wherein MO represents at least one member selected from the group consisting of BaO, CaO, SrO, MgO, ZnO, and MnO), and the internal electrodes are made up of nickel or a nickel alloy.

In a preferred embodiment of the monolithic ceramic capacitor of the present invention, the composition of the $SiO_2$-$TiO_2$-MO-based oxide glass is, when plotted on a triangular diagram of ($SiO_2$, $TiO_2$, MO) (wherein MO is as defined above), in the area surrounded by, or on, four straight lines connecting four points: A (85,1,14), B (35,51, 14), C (30,20,50), and D (39,1,60) (unit: mol %), and contains at least one of $Al_2O_3$ and $ZrO_2$ in a total amount of not more than about 15 parts by weight per 100 parts by weight of the ($SiO_2$, $TiO_2$MO) component, provided that the amount of $ZrO_2$ is not more than about 5 parts by weight.

In another preferred embodiment, the external electrode is made up of a sintered layer of an electrically conductive metal powder which may contain glass frit. In a still preferred embodiment, the external electrode is composed of a first layer made of a sintered layer of an electrically conductive metal powder which may contain glass frit and a second layer that is formed on the first layer by plating.

DETAILED DESCRIPTION OF THE INVENTION

In the monolithic ceramic capacitor of the present invention, the dielectric ceramic layers are obtained by calcining a dielectric ceramic material comprising (1) (a) barium titanate, (b) at least one of scandium oxide and yttrium oxide, (c) at least one of gadolinium oxide, terbium oxide and dysprosium oxide, (d) manganese oxide, (e) cobalt oxide and (f) nickel oxide at a ratio shown by the above-described compositional formula having incorporated therein (2) magnesium oxide and (3) $SiO_2$-$TiO_2$-MO-based oxide glass (wherein MO represents at least one member selected from the group consisting of BaO, CaO, SrO, MgO, ZnO, and MnO). The dielectric ceramic material can be calcined in a reducing atmosphere without suffering from deterioration of characteristics to provide a highly reliable monolithic ceramic capacitor whose capacity exhibits temperature characteristics satisfying the B characteristics specified by JIS and the X7R characteristics specified by EIA standards, and which exhibits high insulation resistance at room temperature and high temperature.

In the resulting dielectric ceramic laminate, the crystal grains are as small as 1 μm or less so that the grains increase in number per layer. This will secure a sufficient reliability even though the thickness of the dielectric ceramic layer in the laminate is reduced.

The barium titanate constituting the main component (1) contains, as impurities, alkaline earth metal oxides (e.g., SrO and CaO), alkali metal oxides (e.g., $Na_2O$ and $K_2O$), and other oxides (e.g., $Al_2O_3$ and $SiO_2$). Of these impurities, the alkali metal oxides, such as $Na_2O$ and $K_2O$, have been confirmed to be greatly influential on the electrical characteristics. It was proved that a dielectric constant of not smaller than 3000 can be obtained by using barium titanate having an alkali metal oxide content of not more than about 0.02% by weight and preferably about 0.012% or less.

It has also been found that incorporation of oxide glass mainly comprising $SiO_2$-$TiO_2$-MO (wherein MO is at least one member selected from the group consisting of BaO, CaO, SrO, MgO, ZnO, and MnO) into the dielectric ceramic layers brings about improved sintering properties and improved resistance to plating. Further, addition of $Al_2O_3$ and/or $ZrO_2$ to the oxide glass makes it possible to obtain higher insulation resistance.

Dielectric ceramic layers made from the above-described dielectric ceramic material provide a highly reliable, small-sized, and high-capacity monolithic ceramic capacitor, the capacity of which shows reduced variation with temperature. Use of the dielectric ceramic material makes it feasible to use nickel or a nickel alloy as an internal electrode. It is also possible to use nickel or a nickel alloy in combination with a small amount of ceramic powder.

The external electrode is not particularly limited in composition. For example, it can be a sintered layer of a conductive powder of various metals (e.g., Ag, Pd, Ag-Pd, Cu and Cu alloys) or a sintered layer of a mixture of such a conductive metal powder and glass frits of various kinds (e.g., $B_2O_3$-$Li_2O$-$SiO_2$-BaO-based glass frits, $B_2O_3$-$SiO_2$-BaO-based glass frits, $Li_2O$-$SiO_2$-BaO-based glass frits, $B_2O_3$-$SiO_2$-ZnO-based glass frits). Ceramic powder may be used in a small proportion with the conductive metal powder (and glass frits). It is preferable that the sintered layer is plated with Ni, Cu, an Ni-Cu alloy, etc. The plated layer may further be plated with solder, tin, etc.

A monolithic ceramic capacitor according to one embodiment of the present invention will be described by referring to the accompanying drawings.

Figure 1:
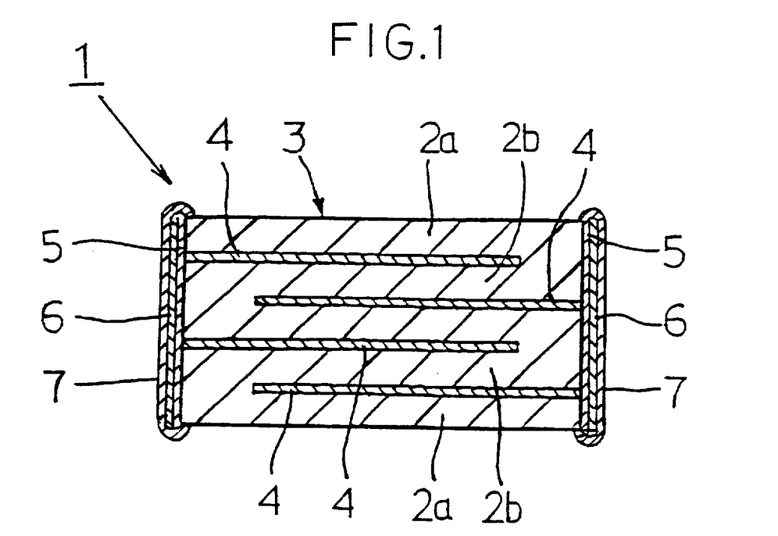
FIG. 1 is a schematic cross section of a monolithic ceramic capacitor according to one embodiment of the present invention.
Figure 2:
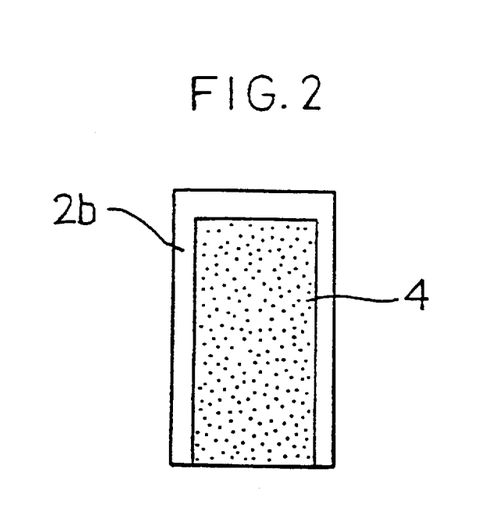
FIG. 2 is a schematic plan of a ceramic layer with an internal electrode which is used in the monolithic ceramic capacitor of FIG. 1.
Figure 3:
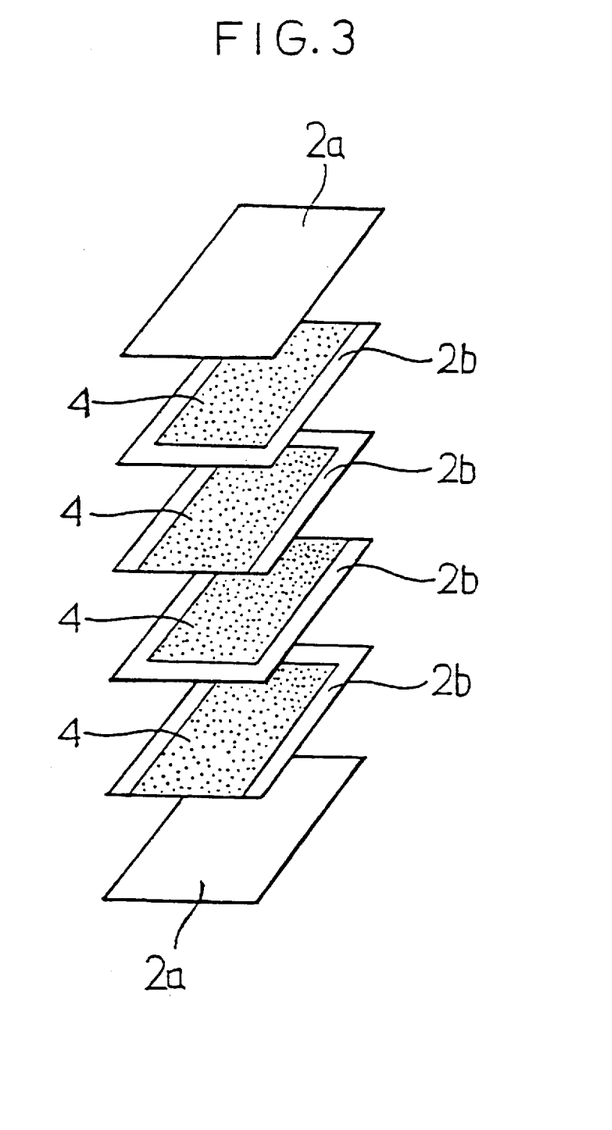
FIG. 3 is a perspective exploded view of the ceramic laminate used in the monolithic ceramic capacitor of FIG. 1.

FIG. 1 is a schematic cross section of the monolithic ceramic capacitor. FIG. 2 is a schematic plan of a ceramic layer having an internal electrode used in the monolithic ceramic capacitor of this embodiment. FIG. 3 is a perspective exploded view of the ceramic laminate used in the monolithic ceramic capacitor of this embodiment.

As shown in FIG. 1, the monolithic ceramic capacitor 1 is of rectangular chip type having a ceramic laminate 3 composed of a plurality of dielectric ceramic layers 2a and 2b, with an internal electrode 4 being interposed between every two ceramic layers. On each side of the ceramic laminate 3 are formed an external electrode 5, a first plating layer 6 formed by plating with nickel, copper, etc., and a second plating layer 7 formed by plating with solder, tin, etc.

The monolithic ceramic capacitor 1 shown in FIG. 1 can be produced as follows.

(1) A main component comprising (a) barium titanate, (b) at least one of scandium oxide and yttrium oxide, (c) at least one of gadolinium oxide, terbium oxide and dysprosium oxide, (d) manganese oxide, (e) cobalt oxide and (f) nickel oxide, (2) magnesium oxide, and (3) $SiO_2$-$TiO_2$-MO-based oxide glass (wherein MO is as defined above) are compounded together with a binder and a solvent into a slurry and molded to prepare a dielectric ceramic layer 2 (green sheet). An internal electrode 4 of nickel or a nickel alloy is formed on one side of the dielectric ceramic layer 2 by screen printing, vacuum evaporation or plating to obtain a dielectric ceramic layer 2b having an internal electrode 4 as shown in FIG. 2.

A requisite number of the dielectric ceramic layers 2b are piled up and press-bonded in between a pair of dielectric ceramic layers 2a having no internal electrode to obtain a laminate as shown in FIG. 3. The laminate of the dielectric ceramic layers 2a, 2b . . . 2b, 2a is calcined in a reducing atmosphere at a prescribed temperature to form a ceramic laminate 3.

An external electrode 5 is then formed on each side of the ceramic laminate 3 to make an electrical connection to the internal electrodes 4. The external electrodes 5 can be made of the same material as used for the internal electrodes 4. In addition, silver, palladium, silver-palladium alloy, copper, copper alloy, etc. are also useful. These metal powders may be used in combination with glass frits, such as $B_2O_3$-$SiO_2$-BaO-based glass frits or $Li_2O$-$SiO_2$-BaO-based glass frits. The material of the external electrode should be selected appropriately taking into consideration the use of the resulting monolithic ceramic capacitor, the place of use, and the like. The external electrodes 5 can be formed by applying a paste of the metal powder selected to the ceramic laminate 3 (i.e., a calcined laminate) followed by baking. Alternatively, the paste may be applied to the laminate of the green sheets before calcination and baked to form the electrodes 5 and the ceramic laminate 3 simultaneously.

The external electrodes 5 are then plated with nickel, copper, etc. to form a first layer 6. Finally, the first layer 6 is plated with solder, tin, etc. to form a second layer 7, thereby to produce a monolithic ceramic capacitor 1 of the chip type.

As described above, the ceramic material used in the present invention does not undergo reduction and therefore does not change into a semiconductor even if calcined in a reducing atmosphere, which allows use of a base metal (nickel or a nickel alloy) as an electrode material. Further, calcination of the ceramic material can be achieved at a relatively low temperature of not higher than 1300° C. As a result, both the material cost and the process cost of monolithic ceramic capacitors can be reduced.

The monolithic ceramic capacitor according to the present invention exhibits excellent characteristics, having a dielectric constant of not smaller than 3000, showing reduced variation in dielectric constant with temperature change, having a high insulation resistance, and undergoing no deterioration in characteristics under a high temperature or high humidity condition.

The grain size of the dielectric ceramic material according to the present invention is as small as about 1 μm or less. Therefore, if the thickness of dielectric ceramic layers constituting a monolithic ceramic capacitor is reduced, each layer can have a greater number of crystal grains than in conventional monolithic ceramic capacitors. There is thus provided a highly reliable, small-sized, and yet high-capacity monolithic ceramic capacitor.

The present invention will now be illustrated in greater detail with reference to Examples, but it should be understood that the present invention is not construed as being limited thereto.

EXAMPLE 1

$TiCl_4$ and $Ba(NO_3)_2$ both having varied purity were weighed and treated with oxalic acid to precipitate barium titanyl oxalate ($BaTiO(C_2O_4)$•$4H_2O$). The precipitate was thermally decomposed at or above 1000° C. to synthesize 4 species of barium titanate ($BaTiO_3$) shown in Table 1 below.

TABLE 1

| Kind of $BaTiO_3$ | Content of Impurities (wt %) | | | | | Average Particle Size (μm) |
| --- | --- | --- | --- | --- | --- | --- |
| | Alkali Metal Oxide | SrO | CaO | $SiO_2$ | $Al_2O_3$ | |
| A | 0.003 | 0.012 | 0.001 | 0.010 | 0.005 | 0.60 |
| B | 0.020 | 0.010 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

Oxides, carbonates or hydroxides of silicon, titanium, barium, strontium and manganese were weighed and mixed so as to give an $SiO_2$:$TiO_2$:BaO:SrO:MnO molar ratio of 0.60:0.25:0.10:0.02:0.03. The mixture was ground and evaporated to dryness to obtain powder. The powder was melted by heating in an aluminum crucible at 1300° C., quenched, and ground to obtain powdered oxide glass having an average particle size of not greater than 1 μm.

The compositions shown in Table 2 below were compounded from (i) the barium titanate of Table 1, (ii) the powdered oxide glass prepared above, (iii) $BaCO_3$ serving for adjustment of the Ba/Ti molar ratio of barium titanate and (iv) $Sc_2O_3$, $Y_2O_3$, $Gd_2O_3$, $Tb_2O_3$, $Dy_2O_3$, $MnCO_3$, NiO, $Co_2O_3$ and MgO, each having a purity of not lower than 99%.

TABLE 2

| | | [(1 −α − β){BaO}$_m$●TiO$_2$ + α{(1 − x)M$_2$O$_3$ + xReO$_3$} + β(Mn$_{1-y-z}$Ni$_y$Co$_z$)O] | | | | | | | | | | | | | | MgO | Amount of Oxide Glass |
|---|---|---|---|---|---|---|---|---|---|---|---|---|---|---|---|---|---|
| Sample | Kind of | | M | | | Re | | | | | | | | | | (mol | (part by |
| No. | BaTiO$_3$ | α | Sc | Y | 1 − x | Gd | Tb | Dy | x | β | β/α | y | z | y + z | m | %**) | weight***) |
| 1* | A | 0.0000 | | | | | | | | 0.00300 | | 0.10 | 0.30 | 0.40 | 1.015 | 1.00 | 0.80 |
| 2* | A | 0.0120 | | 0.80 | 0.80 | 0.20 | | | 0.20 | 0.0000 | | | | | 1.010 | 1.20 | 1.00 |
| 3* | A | 0.0100 | | 1.00 | 1.00 | | | | 0.00 | 0.0200 | 2.0 | 0.10 | 0.10 | 0.20 | 1.005 | 0.80 | 1.00 |
| 4* | A | 0.0150 | | 0.80 | 0.80 | | | 0.20 | 0.20 | 0.0300 | 2.0 | 0.20 | 0.20 | 0.40 | 0.990 | 1.00 | 1.00 |
| 5* | A | 0.0150 | | 0.70 | 0.70 | | | 0.30 | 0.30 | 0.0450 | 3.0 | 0.20 | 0.30 | 0.50 | 1.000 | 0.80 | 1.00 |
| 6* | A | 0.0200 | | 0.80 | 0.80 | | | | 0.20 | 0.0200 | 1.0 | 0.30 | 0.10 | 0.40 | 1.015 | 0.20 | 0.80 |
| 7* | A | 0.0150 | 0.10 | 0.70 | 0.80 | | | | 0.20 | 0.0300 | 2.0 | 0.10 | 0.10 | 0.20 | 1.005 | 1.20 | 0.00 |
| 8 | A | 0.0025 | | 0.80 | 0.80 | 0.10 | | | 0.10 | 0.0025 | 1.0 | 0.10 | 0.10 | 0.20 | 1.010 | 1.00 | 0.20 |
| 9 | A | 0.0250 | | 0.70 | 0.70 | | | 0.30 | 0.30 | 0.0500 | 2.0 | 0.10 | 0.30 | 0.40 | 1.005 | 0.80 | 1.20 |
| 10 | A | 0.0060 | 0.10 | 0.70 | 0.80 | | 0.20 | | 0.20 | 0.0240 | 4.0 | 0.10 | 0.30 | 0.40 | 1.010 | 1.20 | 1.00 |
| 11 | B | 0.0100 | 0.50 | | 0.50 | | | 0.50 | 0.50 | 0.0150 | 1.5 | 0.20 | 0.30 | 0.50 | 1.020 | 1.50 | 1.20 |
| 12 | C | 0.0100 | | 0.90 | 0.90 | | | 0.10 | 0.10 | 0.0050 | 0.5 | 0.00 | 0.50 | 0.50 | 1.010 | 1.00 | 1.00 |
| 13 | A | 0.0150 | | 0.80 | 0.80 | 0.20 | | | 0.20 | 0.0300 | 2.0 | 0.10 | 0.00 | 0.10 | 1.005 | 0.50 | 1.00 |
| 14 | A | 0.0050 | | 0.70 | 0.70 | | 0.10 | 0.20 | 0.30 | 0.0150 | 3.0 | 0.00 | 0.00 | 0.00 | 1.005 | 5.00 | 1.20 |
| 15 | A | 0.0100 | | 0.80 | 0.80 | 0.10 | 0.10 | | 0.20 | 0.0300 | 3.0 | 0.10 | 0.30 | 0.40 | 1.035 | 0.80 | 1.20 |
| 16 | A | 0.0100 | | 0.80 | 0.80 | 0.10 | 0.05 | 0.05 | 0.20 | 0.0200 | 2.0 | 0.10 | 0.10 | 0.20 | 1.010 | 1.00 | 3.00 |
| 17* | A | 0.0300 | | 0.80 | 0.80 | 0.20 | | | 0.20 | 0.0450 | 1.5 | 0.10 | 0.10 | 0.20 | 1.010 | 1.00 | 1.50 |
| 18* | A | 0.0200 | | 0.80 | 0.80 | | | 0.20 | 0.20 | 0.0700 | 3.5 | 0.20 | 0.40 | 0.60 | 1.010 | 0.80 | 1.00 |
| 19* | A | 0.0050 | | 0.70 | 0.70 | 0.10 | | 0.20 | 0.30 | 0.0300 | 6.0 | 0.10 | 0.10 | 0.20 | 1.015 | 1.00 | 0.80 |
| 20* | A | 0.0150 | | 0.20 | 0.20 | 0.80 | | | 0.80 | 0.0150 | 1.0 | 0.10 | 0.30 | 0.40 | 1.010 | 1.00 | 1.20 |
| 21* | A | 0.0150 | | 0.80 | 0.80 | | 0.20 | | 0.20 | 0.0300 | 2.0 | 0.00 | 1.00 | 1.00 | 1.010 | 1.00 | 1.00 |
| 22* | A | 0.0050 | 0.10 | 0.70 | 0.80 | 0.20 | | | 0.20 | 0.0150 | 1.5 | 0.40 | 0.60 | 1.00 | 1.010 | 1.20 | 1.20 |
| 23* | A | 0.0100 | | 0.70 | 0.70 | | | 0.30 | 0.30 | 0.0150 | 1.5 | 0.40 | 0.60 | 1.00 | 1.010 | 1.20 | 1.20 |
| 24* | A | 0.0100 | 0.20 | 0.60 | 0.80 | | | 0.20 | 0.20 | 0.0300 | 3.0 | 0.20 | 0.20 | 0.40 | 1.050 | 0.80 | 1.20 |
| 25* | A | 0.0100 | | 0.70 | 0.70 | 0.30 | | | 0.30 | 0.0250 | 2.5 | 0.10 | 0.10 | 0.20 | 1.005 | 7.00 | 1.00 |
| 26* | A | 0.0050 | | 0.70 | 0.70 | | 0.30 | | 0.30 | 0.0150 | 3.0 | 0.30 | 0.10 | 0.40 | 1.010 | 0.80 | 5.00 |
| 27* | D | 0.0150 | | 0.90 | 0.90 | 0.10 | | | 0.10 | 0.0300 | 2.0 | 0.20 | 0.20 | 0.40 | 1.010 | 1.20 | 1.00 |

*Samples with an asterisk are those out of the scope of the invention.
**Based on the main component
***Per 100 parts by weight of (main component + MgO)

The resulting mixture was kneaded in a ball mill in a wet process together with a polyvinyl butyral-based binder and an organic solvent, such as ethanol, to prepare a ceramic slurry. The slurry was shaped into a 11 μm thick rectangular green sheet by means of a doctor blade. A conductive paste mainly comprising nickel was screen printed on the ceramic green sheet to form a conductive paste layer one end of which reached the end of the green sheet.

A plurality of the ceramic green sheets were piled up in such a manner that the every other ceramic green sheet had its end with the internal electrode exposed arranged on one side of the resulting laminate. The laminate was heated at 350° C. in a nitrogen atmosphere to burn the binder and then calcined at a temperature shown in Table 3 for 2 hours in a reducing atmosphere of $H_2$-$N_2$-$H_2O$ gas having an oxygen partial pressure of $10^{-9}$ to $10^{-12}$ MPa to obtain a ceramic laminate.

The surface of the resulting ceramic laminate was observed under a scanning electron microscope at 1500 magnifications to measure the grain size.

A silver paste containing $B_2O_3$-$Li_2O$-$SiO_2$-BaO-based glass frit was applied onto both sides of the ceramic laminate where the internal electrodes were exposed and baked at 600° C. in a nitrogen atmosphere to form an external electrode electrically connected to the internal electrodes.

The thus prepared monolithic ceramic capacitor had a width of 1.6 mm, a length of 3.2 mm and a thickness of 1.2 mm. Each dielectric ceramic layer between two internal electrode layers had a thickness of 8 μm. The number of effective dielectric ceramic layers was 19. The area of the opposing electrodes was 2.1 mm² per side.

The electric characteristics of the condenser were measured. The capacitance (C) and the dielectric loss (tan δ) were measured with an automatic bridge type meter at 1 kHz, 1 Vrms and 25° C. From the capacitance was calculated the dielectric constant (ε). The insulation resistance (R) was measured by applying a direct voltage of 16 V for 2 minutes at 25° C. and 125° C. with an insulation resistance tester, and the product of the capacitance (C) and the insulation resistance (R), i.e., CR product, was obtained.

Further, capacitance was measured at varying temperatures to determine the percentage difference between capacitances measured at −25° C. or 85° C. and 20° C. to the capacitance at 20° C. (percentage change: ΔC/C20° C.), a percentage of a difference between capacitances measured at −55° C. or 125° C. and 25° C. to the capacitance at 25° C. (percentage change: ΔC/C25° C.), and the maximum absolute percentage change in capacitance measured in a temperature range of from −55° to 125° C. (|C|$_{max}$).

The duration of the condenser was evaluated by a high-temperature loading test. A direct voltage of 100 V was applied to each of 36 condensers per sample at 150° C., and the insulation resistance (R) was measured with time. The time when the insulation resistance fell to $10^6$ Ω or lower was taken as the life duration, and an average duration of life was obtained for each sample.

Furthermore, the condenser was subjected to a high-humidity loading test in which a direct voltage of 16 V was applied to each of 72 condensers per sample at 121° C., 2 atm and 100% RH, and the insulation resistance (R) was measured with time. The number of rejects whose insulation resistance (R) fell to $10^6$ Ω or lower before 250 hours from the start of the test was counted.

The results of the above measurements are shown in Table 3 below.

TABLE 3

| Sample No. | Calcining Temp. (°C.) | Dielectric Constant (ε) | Dielectric Loss (tan δ) (%) | Percentage Change in Capacitance ΔC C20° C. (%) -25° | 85° | Percentage Change in Capacitance ΔC/C25° C. (%) -55° C. | 125° C. | max | CR Product (25° C.) (MΩ · μF) 16V | CR Product (125° C.) (MΩ · μF) 16V | Average Duration of Life (hr) | Reject Rate in High-Humidity Loading Test | Grain Size (μm) |
|---|---|---|---|---|---|---|---|---|---|---|---|---|---|
| 1* | 1300 | 2780 | 3.0 | −4.9 | 17.4 | −10.9 | 12.8 | 23.2 | 8210 | 2010 | 4 | 0/72 | 0.79 |
| 2* | 1300 | | | unmeasurable due to transformation into a semiconductor | | | | | | | | | 2.7 |
| 3* | 1300 | 3380 | 2.1 | 0.0 | −7.8 | −0.6 | −9.2 | 9.2 | 6350 | 1620 | 311 | 0/72 | 0.74 |
| 4* | 1280 | | | unmeasurable due to transformation into a semiconductor | | | | | | | | | 2.1 |
| 5* | 1280 | 3330 | 2.3 | −0.3 | −9.7 | −0.7 | −11.0 | 11.0 | 4120 | 710 | 102 | 0/72 | 0.73 |
| 6* | 1280 | 3380 | 2.1 | 0.7 | −13.6 | 0.9 | −17.0 | 17.0 | 5310 | 1310 | 303 | 0/72 | 0.74 |
| 7* | 1360 | | | unmeasurable due to undercalcination | | | | | | | | | 0.61 |
| 8 | 12801 | 3360 | 2.2 | 0.0 | −10.0 | −0.2 | −11.4 | 11.4 | 7170 | 4820 | 325 | 0/72 | 0.74 |
| 9 | 1300 | 3110 | 1.6 | −.01 | −7.9 | −0.2 | −8.7 | 8.7 | 6140 | 2420 | 437 | 0/72 | 0.68 |
| 10 | 1300 | 3300 | 1.8 | 0.2 | −7.7 | −0.6 | −10.9 | 1309 | 7600 | 3150 | 426 | 0/72 | 0.73 |
| 11 | 1300 | 3010 | 1.4 | −.01 | −7.0 | −0.8 | −8.2 | 8.2 | 6680 | 2660 | 389 | 0/72 | 0.60 |
| 12 | 1300 | 3260 | 1.8 | 0.1 | −8.3 | −0.2 | −9.0 | 9.0 | 6140 | 2440 | 482 | 0/72 | 0.76 |
| 13 | 1280 | 3080 | 1.5 | −0.1 | −7.1 | −0.5 | −8.8 | 8.8 | 7850 | 3080 | 321 | 0/72 | 0.68 |
| 14 | 1300 | 3170 | 1.7 | −0.3 | −6.0 | −1.3 | −7.4 | 7.4 | 6340 | 2450 | 419 | 0/72 | 0.69 |
| 15 | 1300 | 3300 | 2.0 | 0.1 | −8.7 | 0.5 | −9.9 | 9.9 | 6900 | 2810 | 379 | 0/72 | 0.72 |
| 16 | 1280 | 3080 | 1.3 | 0.8 | −7.3 | 0.1 | −12.1 | 12.1 | 6980 | 2810 | 370 | 0/72 | 0.71 |
| 17* | 1360 | 2260 | 2.0 | 0.2 | −7.7 | −0.5 | −9.0 | 9.0 | 4990 | 1560 | 284 | 12/72 | 0.64 |
| 18* | 1300 | 3010 | 2.0 | 0.1 | −9.8 | −0.6 | −16.0 | 16.0 | 5880 | 890 | 52 | 0/72 | 0.69 |
| 19* | 1300 | 3560 | 2.3 | 1.2 | −13.0 | 0.9 | −19.5 | 19.5 | 6150 | 1430 | 298 | 0/72 | 0.76 |
| 20* | 1300 | 3340 | 2.2 | 1.6 | −15.9 | 0.9 | −18.0 | 18.0 | 6700 | 2030 | 373 | 0/72 | 0.72 |
| 21* | 1300 | 3200 | 1.7 | 0.1 | −9.3 | −0.1 | −11.3 | 11.3 | 4580 | 720 | 173 | 0/72 | 0.71 |
| 22* | 1300 | 3100 | 1.5 | −0.3 | −7.5 | −1.2 | −8.5 | 8.5 | 4650 | 860 | 192 | 0/72 | 0.69 |
| 23* | 1280 | 3180 | 1.8 | 0.9 | −9.7 | −0.1 | −12.1 | 12.1 | 4050 | 690 | 183 | 0/72 | 0.70 |
| 24* | 1360 | | | unmeasurable due to undercalcination | | | | | | | | | 0.61 |
| 25* | 1360 | 2570 | 1.1 | −0.1 | −6.0 | −1.0 | −7.2 | 7.2 | 5070 | 1600 | 353 | 48/72 | 0.66 |
| 26* | 1260 | 2310 | 1.8 | 0.9 | −13.1 | 0.6 | −19.3 | 19.3 | 5120 | 2330 | 401 | 0/72 | 0.64 |
| 27* | 1280 | 2370 | 1.6 | 0.4 | −5.3 | 0.7 | −6.1 | 6.1 | 6810 | 2490 | 498 | 0/72 | 0.64 |

Samples with an asterisk are those out of the scope of the invention.

As is apparent from Tables 1 through 3, the monolithic ceramic capacitors according to the present invention have a dielectric constant (ε) of not smaller than 3000 and a dielectric loss (tan δ) of not more than 2.5%, and their percentage change in capacitance with temperature satisfies the B characteristics standard (JIS) between −25° C. and 85° C. and the X7R characteristics standard (EIA) between −55° C. and 125° C. The insulation resistance at 25° C. or 125° C., as expressed in terms of CR product, is as high as 6000 MΩ•μF or more or 2000 MΩ•μF or more, respectively. The average duration of life is as long as 300 hours or longer. The ceramic material used in these condensers can be calcined at relatively low temperatures of 1300° C. or lower. The grain size of the ceramic is not greater than 1 μm.

In the composition represented by formula $(1-\alpha\beta)\{BaO\}_m \cdot TiO_2 + \alpha\{(1-x)M_2O_3 + xRe_2O_3\} + \beta(Mn_{1-y-z}Ni_y Co_z)O$ (wherein $M_2O_3$ and $Re_2O_3$ are as defined above), α should range from about 0.0025 to 0.025 and preferably about 0.006–0.015. If α, the amount of ($M_2O_3+Re_2O_3$), is less than about 0.0025 as in sample 1, the dielectric constant ε is lower than 3000, the dielectric loss (tan δ) exceeds 2.5%, the capacity considerably varies with temperature change, and the average duration of life is extremely short.

If α exceeds about 0.025 as in sample 17, the dielectric constant does not exceed 3000, the insulation resistance at 25° C. and 125° C. is reduced, the average duration of life is short, a high calcining temperature is required, and rejects occur in a high-humidity loading test.

In the above formula, β representing the amount of (Mn, Ni, Co) should range from about 0.0025 to 0.05 and preferably about 0.005–0.03. If β is less than about 0.0025, the dielectric ceramic is reduced upon calcination in a reducing atmosphere and changes into a semiconductor having a reduced insulation resistance as is observed with sample 2.

If β exceeds about 0.05, the insulation resistance is low, the average duration of life is short, and the variation in capacity with temperature change is large as is observed with sample 18.

The ratio β/α representing the ratio of the amount of (Mn, Ni, Co) to the amount of ($M_2O_3+Re_2O_3$) should be about 4 or less and preferably about 3 or less. If it exceeds about 4, the variation in capacity with temperature change is large, the insulation resistance at 125° C. is lower than 2000 MΩ•μF (in terms of CR product), and the average duration of life is shorter than 300 hours as with sample 19.

x should be more than 0 and not more than about 0.50 and preferably about 0.1–0.3. If x is 0 as in sample 3, the insulation resistance is less than 2000 MΩ•μF (CR product). If x exceeds about 0.5 as in sample 20, the variation in capacity with temperature change is too large to satisfy the B characteristics specified in JIS and the X7R characteristics specified by EIA standards.

m representing the molar ratio of barium titanate should be more than about 1.000 and not more than about 1.035 and preferably about 1.005–1.02. If it is less than about 1.000 the dielectric ceramic material is transformed into a semiconductor as is observed with sample 4. If it is 1.000 as in sample 5, the insulation resistance is low, and the average duration of life is shorter than 300 hours. If the molar ratio m exceeds about 1.035, the calcination properties are extremely poor as is observed with sample 24.

y+z in the above formula should be 0 to less than about 1.0, preferably about 0.1–0.5. If y+z is 1.00 (i.e., Mn is absent) as in samples 21, 22 and 23, the insulation resistance is reduced, and the average duration of life is shorter than 300 hours.

The amount of magnesium oxide as a secondary component should range from about 0.5 to 5.0 mol in terms of MgO per 100 mol of the main component and preferably about 0.8–1.5. If it is less than about 0.5 mol as in sample 6, the insulation resistance is reduced, and the variation in capacity with temperature change becomes high. On the other hand, if the amount of MgO exceeds about 5 mol, the calcining temperature must be increased, and the reject rate in a high-humidity loading test is extremely high as with the case of sample 25.

The amount of the $SiO_2$-$TiO_2$-MO-based oxide glass should be in a range of from about 0.2 to 3.0 parts by weight per 100 parts by weight of the total weight of the main component and the secondary component, MgO, and preferably about 1–1.5. If it is less than about 0.2 part as in sample 7, the ceramic material suffers from undercalcination. If it exceeds about 3.0 parts as in sample 26, the dielectric constant is low, the insulation resistance at 25° C. does not exceed 6000 $M\Omega \cdot \mu F$ (CR product), and the variation in capacity with temperature change becomes larger.

The content of alkali metal oxide impurities in barium titanate should be about 0.02% by weight or less and preferably about 0.012. If it exceeds about 0.02% as in sample 27, reduction in dielectric constant results.

EXAMPLE 2

$SiO_2$-$TiO_2$-MO-based oxide glasses having an average particle size of not greater than 1 $\mu m$ and the composition shown in Table 4 below were prepared by heating a raw material mixture at 1200° to 1500° C. in the same manner as in Example 1. A hundred moles of a main component represented by compositional formula:

$97.5\{BaO\}_{1.010} \cdot TiO_2 + 0.8Y_2O_3 + 0.2Gd_2O_3 + 1.5(Mn_{0.4}Ni_{0.2}Co_{0.4})O$ (molar ratio) in which barium titanate A shown in Table 1 was used, 1.0 mol of MgO, and 1.0% by weight, based on the total weight of the main component and MgO, of the above oxide glass were compounded to prepare a ceramic material.

A monolithic ceramic capacitor was produced in the same manner as in Example 1, except for using the above prepared ceramic material. The electrical characteristics of the resulting condenser were evaluated in the same manner as in Example 1. The results obtained are shown in Table 5 below.

TABLE 4

| Sample No. | Amount of Oxide Glass Added (wt %) | Components of Oxide Glass | | | | | | | | | Additive Component (%) | |
|---|---|---|---|---|---|---|---|---|---|---|---|---|
| | | Main Components (mol %) | | | | | | | | | | |
| | | $SiO_2$ | $TiO_2$ | MO | | | | | | | $Al_2O_3$ | $ZrO_2$ |
| | | | | BaO | CaO | SrO | MgO | ZnO | MnO | Total | | |
| 101 | 1.0 | 85 | 1 | 1 | — | — | — | 4 | 9 | 14 | — | — |
| 102 | 1.0 | 35 | 51 | — | 10 | — | — | — | 4 | 14 | — | — |
| 103 | 1.0 | 30 | 20 | — | 30 | — | 15 | 4 | 1 | 50 | — | — |
| 104 | 1.0 | 39 | 1 | 20 | 20 | 2 | — | 13 | 5 | 60 | — | — |
| 105 | 1.0 | 70 | 10 | 5 | 5 | — | — | 10 | — | 20 | — | — |
| 106 | 1.0 | 45 | 10 | — | — | — | — | 15 | 30 | 45 | — | — |
| 107 | 1.0 | 50 | 20 | 10 | 10 | 3 | 7 | — | — | 30 | — | — |
| 108 | 1.0 | 50 | 30 | — | 16 | — | — | — | 4 | 20 | — | — |
| 109 | 1.0 | 35 | 30 | 25 | 10 | — | — | — | — | 35 | — | — |
| 110 | 1.0 | 40 | 40 | 10 | — | — | — | 5 | 5 | 20 | — | — |
| 111 | 1.0 | 45 | 22 | 3 | 30 | — | — | — | — | 33 | 15 | — |
| 112 | 1.0 | 45 | 22 | 3 | 30 | — | — | — | — | 33 | 10 | 5 |
| 113* | 1.0 | 25 | 40 | 15 | — | 10 | — | 5 | 5 | 35 | — | — |
| 114* | 1.0 | 25 | 40 | 15 | — | 10 | — | 5 | 5 | 35 | — | — |
| 115* | 1.0 | 30 | 10 | 30 | 25 | — | — | 5 | — | 60 | — | — |
| 116* | 1.0 | 50 | 0 | 35 | 15 | — | — | — | — | 50 | — | — |
| 117* | 1.0 | 45 | 22 | 30 | — | — | 3 | — | — | 33 | 25 | — |
| 118* | 1.0 | 45 | 22 | 30 | — | 3 | — | — | — | 33 | — | 15 |
| 119* | 1.0 | 30 | 66 | 10 | — | — | — | — | — | 10 | — | — |

Samples with an asterisk are those out of the scope of the invention.

TABLE 5

| Sample No. | Calcining Temp. (°C.) | Dielectric Constant ($\epsilon$) | Dielectric Loss (tan $\delta$) (%) | Percentage Change in Capacitance $\Delta C$ C20° C. (%) | | Percentage Change in Capacitance $\Delta C/C25°$ C. (%) | | | CR Product (25° C.) (M$\Omega \cdot \mu F$) 16V | CR Product (125° C.) (M$\Omega \cdot \mu F$) 16V | Average Duration of Life (hr) | Reject Rate in High-Humidity Loading Test | Grain Size ($\mu m$) |
|---|---|---|---|---|---|---|---|---|---|---|---|---|---|
| | | | | −25° | 85° | −55° C. | 125° C. | max | | | | | |
| 101 | 1300 | 3080 | 1.9 | −1.2 | −7.2 | −2.3 | −8.0 | 8.0 | 6520 | 2420 | 412 | 0/72 | 0.71 |
| 102 | 1300 | 3330 | 2.1 | −1.0 | −7.1 | −1.6 | −7.4 | 7.4 | 6120 | 2160 | 356 | 0/72 | 0.70 |
| 103 | 1300 | 3260 | 1.8 | −0.9 | −8.0 | −0.4 | −9.9 | 9.9 | 6830 | 2710 | 379 | 0/72 | 0.70 |
| 104 | 1300 | 3260 | 1.7 | −1.4 | −6.5 | −1.7 | −7.2 | 7.2 | 6580 | 2500 | 403 | 0/72 | 0.70 |
| 105 | 1280 | 3190 | 2.1 | −0.9 | −7.5 | −1.5 | −8.1 | 8.1 | 6470 | 2520 | 388 | 0/72 | 0.70 |

TABLE 5-continued

| Sample No. | Calcining Temp. (°C.) | Dielectric Constant ($\epsilon$) | Dielectric Loss (tan $\delta$) (%) | Percentage Change in Capacitance $\Delta$C C20° C. (%) -25° | 85° | Percentage Change in Capacitance $\Delta$C/C25° C. (%) -55° C. | 125° C. | max | CR Product (25° C.) (M$\Omega \cdot \mu$F) 16V | CR Product (125° C.) (M$\Omega \cdot \mu$F) 16V | Average Duration of Life (hr) | Reject Rate in High-Humidity Loading Test | Grain Size ($\mu$m) |
|---|---|---|---|---|---|---|---|---|---|---|---|---|---|
| 106 | 1280 | 3250 | 1.8 | −1.3 | −6.3 | −1.6 | −7.4 | 7.4 | 6510 | 2520 | 358 | 0/72 | 0.71 |
| 107 | 1300 | 3270 | 1.8 | −1.2 | −7.9 | −1.6 | −8.9 | 8.9 | 6330 | 2320 | 392 | 0/72 | 0.71 |
| 108 | 1280 | 3150 | 1.5 | −0.5 | −8.6 | −0.1 | −10.7 | 10.7 | 6760 | 2610 | 416 | 0/72 | 0.70 |
| 109 | 1280 | 3410 | 2.2 | −1.1 | −7.1 | −1.6 | −7.4 | 7.4 | 6540 | 2470 | 491 | 0/72 | 0.72 |
| 110 | 1280 | 3300 | 2.0 | −0.3 | −9.2 | 0.0 | −11.3 | 11.3 | 6140 | 2190 | 338 | 0/72 | 0.71 |
| 111 | 1300 | 3110 | 1.9 | −0.7 | −7.8 | −1.2 | −8.8 | 8.8 | 7970 | 3460 | 590 | 0/72 | 0.70 |
| 112 | 1300 | 3070 | 1.8 | −0.6 | −8.4 | −0.8 | −12.7 | 12.7 | 7410 | 3380 | 585 | 0/72 | 0.71 |
| 113* | 1360 | 2660 | 2.5 | −2.1 | −2.3 | −2.8 | 1.5 | 3.0 | 4920 | 1710 | 36 | 53/72 | 0.66 |
| 114* | 1360 | | | | | unmeasurable due to undercalcination | | | | | | | 0.61 |
| 115* | 1360 | | | | | unmeasurable due to undercalcination | | | | | | | 0.61 |
| 116* | 1360 | 3290 | 2.2 | −1.2 | −7.5 | −1.9 | −9.6 | 9.6 | 6440 | 2280 | 363 | 72/72 | 0.70 |
| 117* | 1360 | | | | | unmeasurable due to undercalcination | | | | | | | 0.61 |
| 118* | 1360 | | | | | unmeasurable due to undercalcination | | | | | | | 0.61 |
| 119* | 1360 | | | | | unmeasurable due to undercalcination | | | | | | | 0.61 |

Samples with an asterisk are those out of the scope of the invention.

As is apparent from Tables 4 and 5, the monolithic ceramic capacitors constituted by the dielectric ceramic layers containing $SiO_2$-$TiO_2$-MO-based oxide glass according to the present invention exhibit a high dielectric constant ($\epsilon$) of 3000 or more, a dielectric loss (tan $\delta$) of not more than 2.5%, and their percentage change in capacitance with temperature satisfies the B characteristics standard (JIS) between −25° C. and 85° C. and the X7R characteristics standard (EIA) between −55° C. and 125° C. The insulation resistance at 25° C. or 125° C., as expressed in terms of CR product, is as high as 6000 M$\Omega \cdot \mu$F or more or 2000 M$\Omega \cdot \mu$F or more, respectively. The average duration of life is as long as 300 hours or longer. No rejects were observed in the high-humidity loading test.

Figure 4:
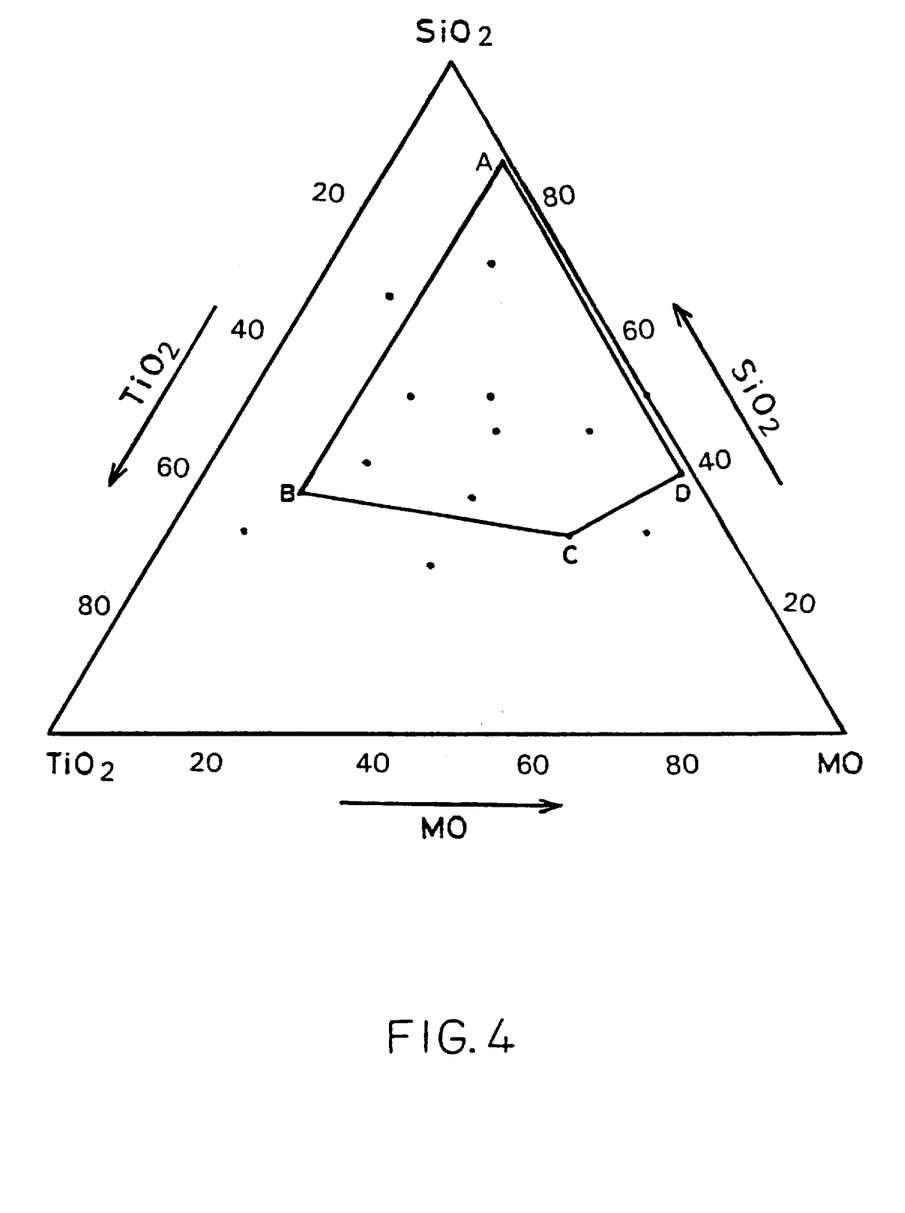
FIG. 4 is a triangular diagram of ($SiO_2$, $TiO_2$, MO) showing a preferred range of the composition of $SiO_2$-$TiO_2$-MO-based oxide glass.

To the contrary, samples 113 to 116 and 119 showed undercalcination or developed rejects in the high-humidity loading test. That is, when the composition of $SiO_2$-$TiO_2$-MO-based oxide glass is plotted on a triangular diagram of ($SiO_2$, $TiO_2$, MO) (wherein MO is as defined above), the composition of the oxide glass used in these samples is not in the area surrounded by, or not on, four straight lines connecting four points: A (85,1,14), B (35,51,14), C (30,20, 50), and D (39,1,60) (unit: mol %).

As is understood from the results of samples 111 and 112, addition of $Al_2O_3$ or $ZrO_2$ to the $SiO_2$-$TiO_2$-MO-based oxide glass is effective to provide a monolithic ceramic capacitor having an insulation resistance (CR product) of not lower than 7000 M$\Omega \cdot \mu$F at 25° C. and not lower than 3000 M$\Omega \cdot \mu$F at 125° C. Note that addition of more than 15 parts by weight of $Al_2O_3$ or more than 5 parts by weight of $ZrO_2$, per 100 parts by weight of the $SiO_2$-$TiO_2$-MO-based oxide glass results in extreme reduction in sintering properties.

While the barium titanate powder used in the foregoing Examples is one prepared by an oxalic acid process, barium titanate powder prepared by an alkoxide process or a hydrothermal process can be used as well. In some cases, use of barium titanate powder prepared by an alkoxide process or a hydrothermal process can bring about better characteristics than demonstrated in the above Examples.

Further, while oxide powders, such as scandium oxide, yttrium oxide, gadolinium oxide, terbium oxide, dysprosium oxide, manganese oxide, cobalt oxide, nickel oxide and magnesium oxide, were used as raw materials, the raw materials for the dielectric ceramic layers are not limited to these oxides. For example, a solution of an alkoxide or an organometallic compound of each metal element can be used as well as long as the resulting ceramic layer has the composition according to the present invention.

While the invention has been described in detail and with reference to specific embodiments thereof, it will be apparent to one skilled in the art that various changes and modifications can be made therein without departing from the spirit and scope thereof.

What is claimed is:

1. A monolithic ceramic capacitor comprising a laminate of a plurality of dielectric ceramic layers, at least internal electrodes between adjacent dielectric ceramic layers in such a manner that one end of each internal electrode is exposed at different ends of the dielectric ceramic layer alternately, and a pair of external electrodes each electrically connected to different exposed internal electrodes, in which said dielectric ceramic layers comprise (a) barium titanate having an alkali metal oxide impurity content of not more than about 0.02% by weight, (b) at least one member selected from the group consisting of scandium oxide and yttrium oxide, (c) at least one member selected from the group consisting of gadolinium oxide, terbium oxide and dysprosium oxide, (d) manganese oxide, (e) cobalt oxide and (f) nickel oxide, and is a material containing (1) 100 mol of a main component represented by the compositional formula:

$$(1-\alpha-\beta)\{BaO\}_m \cdot TiO_2 + \alpha\{(1-x)M_2O_3 + xRe_2O_3\} + \beta(Mn_{1-y-z}Ni_y Co_z)O$$

wherein $M_2O_3$ represents at least one member selected from the group consisting of $Sc_2O_3$ and $Y_2O_3$; $Re_2O_3$ represents at least one member selected from the group consisting of $Gd_2O_3$, $Tb_2O_3$ and $Dy_2O_3$; $0.0025 \leq \alpha \leq 0.025$; $0.0025 \leq \beta \leq 0.05$; $\beta/\alpha \leq 4$; $0 < x \leq 0.50$; $0 \leq y \leq 1.0$; $0 \leq z \leq 1.0$; $0 \leq y+z < 1.0$; and $1.000 < m \leq 1.035$, (2) about 0.5 to 5.0 mol, in terms of MgO, of magnesium oxide and (3) about 0.2 to 3.0 parts by weight, per 100 parts by weight of the total weight of said main component (1) and said magnesium oxide (2), of $SiO_2$-$TiO_2$-MO-based oxide glass, wherein MO represents at least one member selected from the group consisting of BaO, CaO, SrO, MgO, ZnO and MnO.

2. A monolithic ceramic capacitor according to claim 1, wherein the internal electrodes are of nickel or a nickel alloy.

3. A monolithic ceramic capacitor according to claim 2, wherein the alkali metal oxide impurity content of not more than about 0.012% by weight; $M_2O_3$ represents $Y_2O_3$; $Re_2O_3$ comprises $Dy_2O_3$; $0.006 \leq \alpha \leq 0.015$; $0.005 \leq \beta \leq 0.03$; $\beta/\alpha \leq 3$; $0.1 \leq x \leq 0.3$; $0.1 \leq y \leq 0.2$; $0.1 \leq z \leq 0.5$; $0.1 \leq y+z < 0.5$; and $1.005 \leq m \leq 1.02$; the amount of MgO is about 0.8–1.5 mol; the amount of glass is about 1–1.5 parts; and MO comprises CaO.

4. A monolithic ceramic capacitor according to claim 3, wherein the composition of said $SiO_2$-$TiO_2$-MO-based oxide glass is, when plotted on a triangular mol % diagram of ($SiO_2$, $TiO_2$, MO) in the area surrounded by, or on, four straight lines connecting four points: A (85,1,14), B (35,51,14), C (30,20,50), and D (39,1,60) and contains at least one of $Al_2O_3$ and $ZrO_2$ in a total amount of not more than 15 parts by weight per 100 parts by weight of the ($SiO_2$, $TiO_2$, MO) component, provided that the amount of $ZrO_2$ is not more than 5 parts by weight.

5. A monolithic ceramic capacitor according to claim 4, wherein said external electrodes comprise a sintered layer of an electrically conductive metal powder or an electrically conductive metal powder containing glass frit.

6. A monolithic ceramic capacitor according to claim 4, wherein said external electrodes comprise a first layer made of a sintered layer of an electrically conductive metal powder or an electrically conductive metal layer containing glass frit and a second layer of plating on said first layer.

7. A monolithic ceramic capacitor according to claim 1, wherein the alkali metal oxide impurity content of not more than about 0.012% by weight; $M_2O_3$ represents $Y_2O_3$; $Re_2O_3$ comprises $Dy_2O_3$; $0.006 \leq \alpha 0.015$; $0.005 \leq \beta \leq 0.03$; $\beta/\alpha \leq 3$; $0.1 \leq x \leq 0.3$; $0.1 \leq y \leq 0.2$; $0.1 \leq z \leq 0.5$; $0.1 \leq y+z < 0.5$; and $1.005 \leq m \leq 1.02$; the amount of MgO is about 0.8–1.5 mol; the amount of glass is about 1–1.5 parts; and MO comprises CaO.

8. A monolithic ceramic capacitor according to claim 7, wherein the composition of said $SiO_2$-$TiO_2$-MO-based oxide glass is, when plotted on a triangular mol % diagram of ($SiO_2$, $TiO_2$, MO) in the area surrounded by, or on, four straight lines connecting four points: A (85,1,14), B (35,51,14), C (30,20,50), and D (39,1,60) and contains at least one of $Al_2O_3$ and $ZrO_2$ in a total amount of not more than 15 parts by weight per 100 parts by weight of the ($SiO_2$, $TiO_2$, MO) component, provided that the amount of $ZrO_2$ is not more than 5 parts by weight.

9. A monolithic ceramic capacitor according to claim 8, wherein said external electrodes comprise a sintered layer of an electrically conductive metal powder or an electrically conductive metal powder containing glass frit.

10. A monolithic ceramic capacitor according to claim 8, wherein said external electrodes comprise a first layer made of a sintered layer of an electrically conductive metal powder or an electrically conductive metal layer containing glass frit and a second layer of plating on said first layer.

11. A monolithic ceramic capacitor according to claim 1, wherein the composition of said $SiO_2$-$TiO_2$-MO-based oxide glass is, when plotted on a triangular mol % diagram of ($SiO_2$, $TiO_2$, MO) in the area surrounded by, or on, four straight lines connecting four points: A (85,1,14), B (35,51,14), C (30,20,50), and D (39,1,60) and contains at least one of $Al_2O_3$ and $ZrO_2$ in a total amount of not more than 15 parts by weight per 100 parts by weight of the ($SiO_2$, $TiO_2$, MO) component, provided that the amount of $ZrO_2$ is not more than 5 parts by weight.

12. A monolithic ceramic capacitor according to claim 11, wherein said external electrodes comprise a sintered layer of an electrically conductive metal powder or an electrically conductive metal powder containing glass frit.

13. A monolithic ceramic capacitor according to claim 11, wherein said external electrodes comprise a first layer made of a sintered layer of an electrically conductive metal powder or an electrically conductive metal layer containing glass frit and a second layer of plating on said first layer.

14. A monolithic ceramic capacitor according to claim 1, wherein said external electrodes comprise a sintered layer of an electrically conductive metal powder or an electrically conductive metal powder containing glass frit.

15. A monolithic ceramic capacitor according to claim 1, wherein said external electrodes comprise a first layer made of a sintered layer of an electrically conductive metal powder or an electrically conductive metal layer containing glass frit and a second layer of plating on said first layer.

* * * * *